United States Patent
Neumayer et al.

(10) Patent No.: US 8,890,041 B2
(45) Date of Patent: Nov. 18, 2014

(54) DEVICE FOR WARMING FOOD BY MEANS OF INDUCTIVE COUPLING AND DEVICE FOR TRANSFERRING ENERGY

(75) Inventors: Dan Neumayer, Bernau (DE);
Wolfgang Schnell, Trostberg (DE);
Eckhard Wolfgang, München (DE);
Günter Zschau, Traunwalchen (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 2363 days.

(21) Appl. No.: 10/586,692

(22) PCT Filed: Jan. 13, 2005

(86) PCT No.: PCT/EP2005/050118
§ 371 (c)(1),
(2), (4) Date: Jul. 9, 2008

(87) PCT Pub. No.: WO2005/072013
PCT Pub. Date: Aug. 4, 2005

(65) Prior Publication Data
US 2008/0283518 A1    Nov. 20, 2008

(30) Foreign Application Priority Data
Jan. 21, 2004 (DE) .......................... 10 2004 003 119

(51) Int. Cl.
*H05B 6/12* (2006.01)
*H05B 6/36* (2006.01)

(52) U.S. Cl.
CPC ............. *H05B 6/1236* (2013.01); *Y02B 40/123* (2013.01); *H05B 6/365* (2013.01)
USPC ...... 219/622; 219/624; 219/10.493; 219/201; 219/634; 219/635; 310/171; 310/152; 310/50; 310/104

(58) Field of Classification Search
CPC ... H05B 6/1236; H05B 6/36; H01M 10/5006; A47J 36/02
USPC .............. 219/622, 624, 10.493, 10.67, 10.75, 219/10.77, 201, 209, 635, 634; 310/171, 310/152, 156.01, 40 R, 50, 104, 112, 103
See application file for complete search history.

(56) References Cited

U.S. PATENT DOCUMENTS 2,471,128 A * 5/1949 Stein .............................. 219/618
2,864,929 A * 12/1958 Schwing ........................ 219/523
(Continued)

FOREIGN PATENT DOCUMENTS

DE    100 25 539    11/2001
DE    100 31 167    1/2002
(Continued)

OTHER PUBLICATIONS

International Search Report PCT/EP2005/050118.

Primary Examiner — Dana Ross
Assistant Examiner — Ket D Dang
(74) Attorney, Agent, or Firm — James E. Howard; Andre Pallapies

(57) ABSTRACT

A device wherein food can be warmed by means of induction, said device comprising at least one secondary coil which is formed from a current conductor, whereon at least one heating element is connected. The invention also relates to a device which is used to transfer energy in a device in order to warm food by means of induction, said device comprising a primary coil which is connected to a voltage source and which is formed from a current conductor. According to the invention, the primary and secondary coil is cast into a coil body by casting means, and the insulating casting means exhibits a coefficient of thermal expansion which essentially corresponds to the coil body.

24 Claims, 2 Drawing Sheets

(56) References Cited

U.S. PATENT DOCUMENTS

| | | | |
|---|---|---|---|
| 3,281,750 A * | 10/1966 | Steger | 338/253 |
| 3,979,572 A * | 9/1976 | Ito et al. | 219/621 |
| 4,996,405 A | 2/1991 | Poumey et al. | |
| 5,324,767 A | 6/1994 | Koyama et al. | |
| 5,428,207 A | 6/1995 | Essig et al. | |
| 5,698,896 A * | 12/1997 | Komatsu et al. | 257/705 |
| 5,808,281 A | 9/1998 | Matsen et al. | |
| 5,866,884 A * | 2/1999 | Cornec et al. | 219/622 |
| 5,893,996 A * | 4/1999 | Gross et al. | 219/447.1 |
| 5,900,175 A * | 5/1999 | Kicherer et al. | 219/453.14 |
| 6,080,975 A | 6/2000 | Kuse et al. | |
| 6,091,063 A | 7/2000 | Woods | |
| 6,281,611 B1 * | 8/2001 | Chen et al. | 310/171 |
| 6,291,805 B1 * | 9/2001 | Simeray et al. | 219/621 |
| 6,478,843 B1 * | 11/2002 | Wittdorf et al. | 75/302 |
| 6,650,559 B1 * | 11/2003 | Okamoto et al. | 363/141 |
| 6,825,585 B1 * | 11/2004 | Kalldin et al. | 310/65 |
| 2001/0003336 A1 * | 6/2001 | Abbott et al. | 219/543 |
| 2002/0047413 A1 * | 4/2002 | Leijon et al. | 310/112 |
| 2002/0185487 A1 * | 12/2002 | Divakar et al. | 219/444.1 |

FOREIGN PATENT DOCUMENTS

| | | |
|---|---|---|
| JP | 6-20766 | 1/1994 |
| JP | 9-238851 | 9/1997 |
| JP | 9-289946 | 11/1997 |

* cited by examiner

DEVICE FOR WARMING FOOD BY MEANS OF INDUCTIVE COUPLING AND DEVICE FOR TRANSFERRING ENERGY

The invention relates to device wherein food can be warmed by means of inductive coupling and a device for transferring energy.

BACKGROUND

Devices using inductive hob heating for cooking containers are known from the prior art. In this case, the hob heating inside the cooking plate comprises an induction coil through which a high-frequency alternating current flows. This alternating current induces a rapidly varying magnetic field which is guided in the direction of the container. The alternating magnetic field induces an electric voltage inside the base of the container, which is embodied as ferromagnetic, which in turn results in the formation of an eddy current (induction current) which brings about heating of the bottom of the pot. One of the advantages of this type of inductive hob heating is that merely the bottom of the pot and no other energy-storing parts such as the cooking plate, for example, are heated. Consequently, the user cannot burn himself on the cooking plate.

DE 42 24 405 A1 describes an inductive hob heating system of this type which is located underneath a cooking plate, especially a glass ceramic plate and consists of a cohesive assembly containing two induction coils located in a tray. The induction coils are constructed as flat-disk-shaped and are supported by means of thermal insulation on the underside of the glass ceramic plate and by means of a ferrite plate on a heat sink. One of the disadvantages of this type of inductive hob heating system is that the efficiency is negatively influenced by scattering losses of the electric magnetic field. Further losses occur during passage of the magnetic field through the cooking plate so that known inductive hob heating systems can attain a maximum efficiency of around 60%.

Known from DE 100 31 167 A1 is an arrangement for cooking food comprising a cooking surface with a cooking zone to which a first heating element is allocated. A cooking device which can be heated by the first heating element can be placed on the cooking zone, wherein the cooking device comprises a second heating element. In this case, an electrical connection is provided on the cooking surface to which the cooking device with the second heating element can be connected. The advantage of this arrangement is that the cooking device can be heated directly by "active heating" which has a positive effect with regard to the efficiency. A disadvantage however is that the second heating element is connected by means of a cable to the electrical connection. The cable running from the cooking device in the direction of the cable can be disturbing for the use during cooking food, in particular the user can get caught in the cable as a result of any inattentive movement with the consequence that the cooking device can tip.

Known from U.S. Pat. No. 4,996,405 is a device wherein a secondary winding formed from a current conductor and a heating element connected to the winding are located in a base element. The energy for the heating element is transferred from a primary winding which is disposed in a device for the transmission of energy, to the secondary winding by means of induction. One of the disadvantages is that these devices have a relatively large volume with the result that the arrangement of the device in the base element of a pot results in a large-volume pot.

SUMMARY

It is thus the object of the present invention to provide devices which can avoid the aforesaid disadvantages, especially a good efficiency can be achieved when heating food.

The object directed towards the device for heating food is achieved according to the invention by the features described herein.

According to the device for heating food, which for example can be arranged in the bottom area of a container to be heated, it is proposed according to the invention that the secondary winding is cast in a winding body by a casting means and the insulating casting means has a coefficient of thermal expansion which substantially corresponds to that of the winding body. With regard to the device for transferring energy which can be arranged in one embodiment of the invention in a cooking plate, the primary winding is cast in a winding body by a casting means. In this case, the insulating casting means has a coefficient of thermal expansion which corresponds to that of the winding body. When a container is placed on the cooking plate, the arrangement forms a transformer with two transformer halves. The first half—the primary winding with winding body and casting means—is located in the cooking plate and the second half—the secondary winding with winding body and casting means—is located in the container. If a voltage is applied to the primary winding which acts as an induction coil, this produces a magnetic flux which flows in the direction of the secondary winding. In this case, a high-frequency alternating current flows through the primary winding, whereby the energy supply can be finely metered by means of an electronic circuit. As a result of the winding body which preferably consists of ferrite, a material comprising electrically non-conducting metal oxides, good energy transfer is achieved from the primary to the secondary winding. The winding body causes the magnetic flux to be guided precisely into the secondary winding, resulting in few scattering losses in relation to the magnetic field, which is associated with an improved efficiency. Furthermore, a high energy transmission can be achieved by means of a small design.

In the secondary winding, the magnetic flux is converted into electrical energy, in particular a voltage is induced. The secondary winding is thus a current-carrying conductor which advantageously need not be connected to an electrical connection via hobs. The heating element is heated as a result of the voltage induced in the secondary winding.

During operation of the devices according to the invention, the primary and secondary windings which can be disposed, for example, in a recess of the winding body, heat up, the casting compound absorbing the heat. The casting compound is preferably temperature-resistant and can, for example, comprise epoxy resin or polyamide. In this connection, it is particularly important that the coefficient of thermal expansion of the heat-absorbing casting means is matched to that of the winding body. It is hereby achieved that as a result of the heat generated during operation of both devices, the winding body and the casting means can expand uniformly without mechanical stresses being formed in the area of the recesses, for example. The matching of the coefficient of thermal expansion can be achieved, for example, by adding fillers to the casting means.

In a further advantageous embodiment of the invention, an electrically non-conducting protective layer having a small thickness is applied to the winding body, this layer having a coefficient of thermal expansion which substantially corresponds to that of the winding body. If the container to be heated is located on the cooking plate, both protective layers lie one above the other. The thickness of the respective protective layer is preferably a maximum of 500 µm so that as few losses as possible are formed during the transfer of the magnetic field from the primary into the secondary winding. As a result of the small thickness of the protective layer, it is advantageous if, in addition to the coefficient of thermal expansion of the casting means, the coefficient of thermal expansion of the protective layer is matched to that of the winding body. During the transfer of energy into the secondary winding, the casting means, the winding body and the protective layer expand uniformly without the protective layer constructed as a result of the small thickness being damaged, for example, as a result of thermal stresses being formed. The coefficient of thermal expansion of the protective layer and/or the casting means is preferably matched to the coefficient of thermal expansion of the winding body for a temperature range of −20° C. to 150° C.

The protective layer disposed on the winding body appropriately has a high material hardness. This type of formation of the protective layer is preferably suitable for the device for transferring energy or for the cooking plate since this tends to scratch quickly as a result of the frequent placement of containers. Since the protective layer is constructed as very thin, it is advantageous if this is configured with a particularly high hardness. In one embodiment of the invention, the protective layer can be an amorphous hydrocarbon layer (a-C:H layer). In this case, the a-C:H layer can be applied to the winding body by high-frequency discharges, magneto sputtering, ion beam methods, vapour deposition or by a plasma-assisted deposition method (CVD method). With regard to the CVD method, an argon plasma is ignited using hydrocarbon gases (e.g. acetylene) in a vacuum chamber, wherein the molecules of the reactive gas are fragmented into different breakdown products. Finally, condensable hydrocarbons polymerise from this chemical vapour phase on the respective component surface (winding body) to form a diamond-like layer. The surface of the winding body thus acquires diamond-like properties. For a layer thickness of about 3 µm, the amorphous hydrocarbon layer can attain hardnesses of up to 3500 HV (Vickers hardness), that is more than highly hardened steels. The substantial advantage of this layer is furthermore that despite its extreme hardness this is capable of absorbing energy by elastic deformation under high loads. This combination of hardness and elasticity produces a very good wear resistance of the surface of the winding body.

With regard to the container to be heated, it is not absolutely necessary to form the protective layer as a hard layer since in general, higher mechanical forces can act on the cooking plate than on the container bottom. As a result of the lower tendency of the container to scratching, it is sufficient to construct the protective layer merely as thin and electrically non-conducting. One possibility of the invention is to configure the protective layer as a film which bears against the winding body. The protective layer can, for example, comprise ceramic or polytetrafluoroethylene (PTFE). Naturally, in a further alternative it is also possible to configure the protective layer as a hard layer, especially as an a-C:H layer.

BRIEF DESCRIPTION OF FIGURES

Further advantages, features and details of the invention are obtained from the following description wherein an exemplary embodiment of the invention is described in detail with reference to the drawings. The features mentioned in the claims and in the description are important to the invention individually for themselves or in any combination. In the figures:

DETAILED DESCRIPTION

Figure 1:
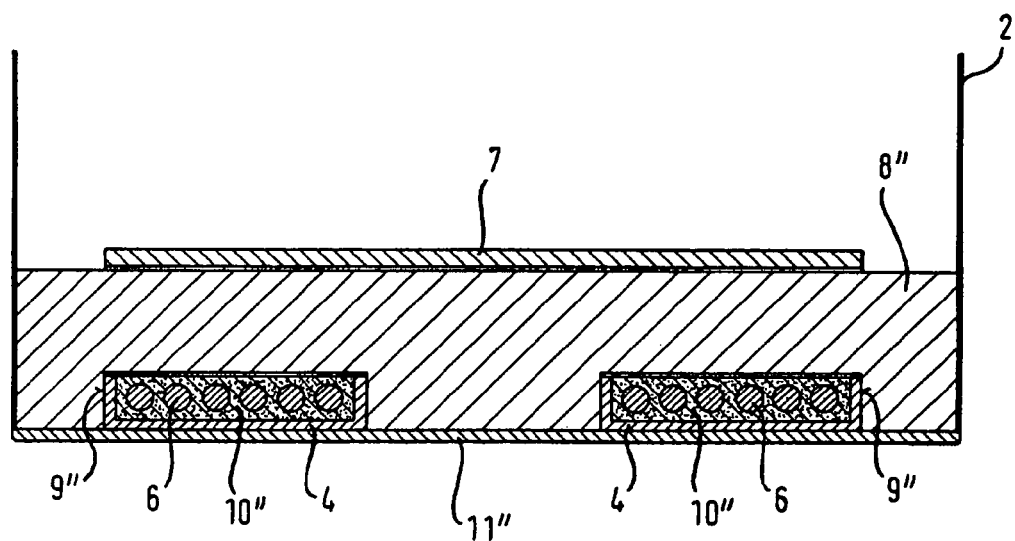
FIG. 1 is a schematic sectional view of a container in which food can be heated by means of induction and FIG. 2 is a schematic sectional view of a cooking plate which transfers energy into the container according to FIG. 1.

FIG. 1 shows a container 2 with a base in which a winding body 8" is located. The winding body 8" consists of a ferrite which has a recess 9" in the exemplary embodiment shown. Located in the recess 9" which has a rectangular shape (groove) in the cross-section is a secondary winding 6 formed from a current conductor. The secondary winding 6 acts as an induction coil and is composed of a plurality of strands which are assembled from individual conductors which is not explicitly shown in the figures. The individual conductors consisting of copper can preferably be electrically insulated from one another by means of a heat-resistant varnish layer. The secondary winding 6 is cast in the recess 9" by an electrically insulating casting means 10" which in the present example is epoxy resin which incorporates additional ceramic fillers. Polyamide with added fillers can also be used as casting means 10".

Located on the underside of the winding body 8" is a protective layer 11" which in the exemplary embodiment shown has a small thickness of about 100 µm. The protective layer 11" is electrically non-conducting and is constructed as a film. The film 11" is stuck on the underside of the winding body 8" and contains ceramic. In another embodiment of the invention, the film 11" can also consist of polytetrafluoroethylene or another plastic. The film 11" can also be applied by laminating-on. The recess 9" is therefore delimited on the one hand by the winding body 8" and on the other hand, on one side by the protective layer 11".

A heating element 7 is arranged on the upper side of the winding body 8", that is on the side of the winding body 8" facing away from the secondary winding 6. The heating element 7 which is connected to the secondary winding 6 consists of a heating conductor not shown which operates as a resistance heater. The heating conductor is connected to the secondary winding 6 via two contact points. The heating element 7 can, for example, be configured as a porcelain enamelled metal layer system to which the heating conductor is applied. In a further alternative of the invention, it is possible to connect a plurality of heating conductors to the secondary winding 6. The heating conductor is distributed uniformly over the entire surface of the heating element 7 so that uniform heating of the heating element 7 can be achieved. The heating conductor can, for example, have a meander-shaped or a bifilar spiral profile. Located above the heating element 7 is the material (not shown) which is to be heated by the heat generated by the heating conductor. So that as little heat as possible is lost during heating of the material, thermal insulation can be provided between the heating element 7 and the secondary winding 6. It is hereby achieved that as far as possible, the entire heat flow from the heating element 7 is guided upwards, that is in the opposite direction to the secondary winding 6 so that the material can be efficiently heated. The thermal insulation can, for example, comprise vermiculite which has a very low thermal conductivity. Vermiculate is mechanically stable and has a high temperature resistance up to about 1000° C. The thermal insulation also has the effect that the secondary winding 6 is not heated unnecessarily by heat produced from the heating element 7 whereby the secondary winding 6 could be damaged or even fail completely.

Figure 2:
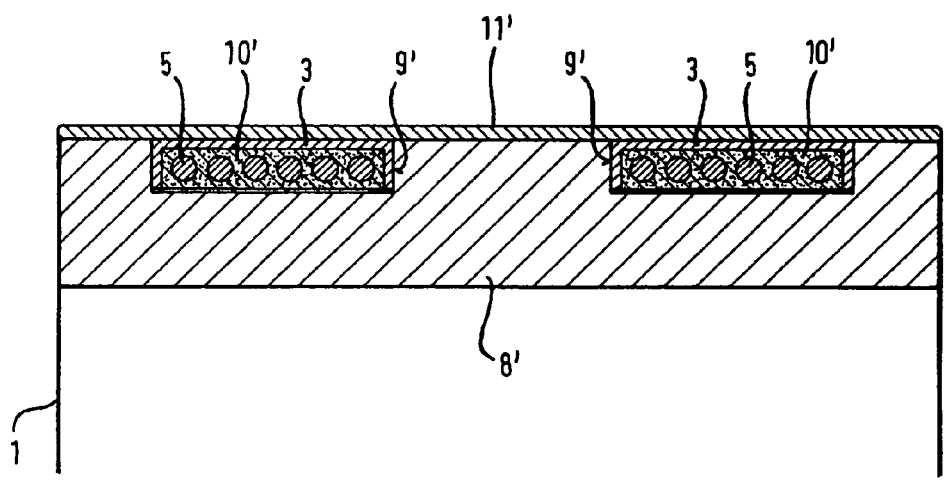

FIG. 2 shows a device 1 for transferring energy which is embodied as a cooking plate 1. The cooking plate 1 has a winding body 8' which is constructed as substantially mirror-symmetrical to the winding body 8" of the container 2 to be heated. The winding body 8' consisting of ferrite likewise has a recess 9' which contains a primary winding 5 connected to a voltage source not shown. The primary winding 5 is surrounded by an insulating casting means 10'. A protective layer 11' is located on the winding body 8'. The further configuration of the cooking plate 1, especially the casting means 10', the winding body 8' and the primary winding 6 corresponds to the casting means 10", the winding body 8" and the secondary winding 6 of the container 2 so that reference is merely made herewith to avoid repetitions.

The protective layer 11' of the cooking plate 1 has a high material hardness which is achieved by an amorphous hydrocarbon layer. In addition to its small thickness of about 100 µm and its electrically non-conducting property, the protective layer 11' is also distinguished by its particularly high hardness so that scratching of the cooking plate 1 is largely avoided.

In the present exemplary embodiment, at the edge, that means towards the winding body 8', 8" and towards the protective layer 11', 11", the casting means 10', 10" contained in the recess 9', 9" of the rotationally symmetrical winding body 8', 8" of the cooking plate 1 or the container 2 has a frame 3, 4 which also consists of epoxy resin. The frame 3,4 is used as an aid during assembly where first the primary or the secondary winding 5, 6 is initially guided into the frame 3, 4 which is open to one side and then the epoxy resin 10', 10" is poured in. The open frame 3, 4 is then closed by a cover which also consists of epoxy resin. The unit comprising casting means 10', 10" and primary and secondary winding 5, 6 can then be inserted in the recess 9', 9" of the winding body 8', 8".

In a further embodiment it is also possible to achieve an arrangement of the primary and secondary winding 5, 6 in the winding body 8', 8" without frames 3, 4. In this alternative, it is possible to guide the primary and secondary winding 5, 6 into the recess 9', 9" and then merely pour the insulating casting means 10', 10" into the recess 9', 9".

When the container 2 is placed on the cooking plate 1, both protective layers 11', 11" lie one above the other. When voltage is applied, the primary winding 5 generates a magnetic flux which is guided in the direction of the secondary winding 6. The ferrite winding body 8', 8" which has a high electrical resistance, as well as its geometry in this case promote guidance of the magnetic flux towards the bottom of the container. In the secondary winding 6 the magnetic flux is converted into electrical energy, the secondary winding 6 comprising a current-carrying conductor. At the same time, current flows through the heating element 7 with its heating conductor which is connected to the secondary winding 6 so that the bottom of the container is heated.

The device according to the invention 1,2 has a high efficiency significantly higher than that of commercially available inductive arrangements which approximately reach an efficiency of up to 60%. The high efficiency is achieved, among other things by the fact that the magnetic flux is guided precisely from the primary into the secondary winding 5, 6. Moreover, no substantial scattering losses occur during passage of the magnetic flux through the two adjacent protective layers 11', 11" since these firstly consist of an electrically non-conducting material and secondly, they are constructed as very thin.

However, in order that the cooking plate 1 or the bottom of the container 2 remain sufficiently mechanically stable as a result of the distributions of compressive and tensile stress formed by the heating process, the casting means 10', 10" and the protective layer 11', 11" have a coefficient of thermal expansion which substantially corresponds to that of the winding body 8', 8". The ferrite winding body 8', 8" can, for example, have a coefficient of thermal expansion of around 10 ppm/K. The coefficient of thermal expansion of the casting means 10', 10" can be matched to that of the winding body 8', 8" by adding suitable fillers. The fillers can, for example, be particles or fibres mixed with the casting means 10', 10". In the present exemplary embodiment, the fillers are small ceramic balls incorporated in the casting means 10', 10". During heating of the material located in the container, the winding body 8', 8", the casting means 10', 10" and the protective layer 11', 11" expand uniformly without cracks being formed by thermal stresses. It is particularly important to match the coefficient of thermal expansion of the protective layer 11', 11" since this is particularly sensitive as a result of its small thickness. In the embodiment of the invention shown, the matching of the coefficient of thermal expansion of the casting means 10', 10" and that of the protective layer 11', 11" to the coefficient of thermal expansion of the winding body 8', 8" relates to the temperature range of about −20° C. to 150° C.

In a further embodiment not shown, the invention can also relate to a device 2 in which food can be heated by means of induction comprising at least one secondary winding 6 formed from a current conductor to which at least one heating element 7 is connected, wherein the secondary winding 6 is cast in a winding body 8" by a casting means 10" and the insulating casting means 10" has a coefficient of thermal expansion which substantially corresponds to that of the winding body 8". The device 1 for transferring energy to the device 2 for heating food by means of induction is constructed with a primary winding 5 formed from a current conductor and connector to a voltage source, which is cast in a winding body 8' by casting means 10', said insulating casting means 10' having a coefficient of thermal expansion which substantially corresponds to that of the winding body 8'. The only difference from the embodiment shown is that the coefficient of thermal expansion of the casting means 10', 10" corresponds to that of the winding body 8', 8". According to the exemplary embodiment shown, a protective layer 11', 11" is not provided on the winding body 8', 8". The remaining configurations, especially with regard to the winding body 8', 8", the casting means 10', 10", the primary and the secondary winding 5, 6 and the heating element 7 correspond to the devices 1, 2 shown so that reference is merely made to these to avoid repetitions.

Furthermore, in the device 2 for heating food and in the device 1 for transferring energy, the primary and the secondary winding 5, 6 can be arranged in a winding body 8', 8", wherein an electrically non-conducting protective layer 11', 11" having a small thickness is arranged on the winding body 8', 8", said layer having a coefficient of thermal expansion substantially corresponding to that of the winding body 8', 8". This embodiment is distinguished by the fact that merely the coefficient of thermal expansion of the protective layer 11', 11" and not that of the casting means 10', 10" substantially corresponds to the coefficient of thermal expansion of the ferrite winding body 8', 8". With regard to the remaining configurations of the devices 1, 2 reference is made to the embodiments already described in accordance with FIGS. 1 and 2.

REFERENCE LIST

1. Device for transferring energy, cooking plate
2. Device in which food is heated, container 3. Frame
4. Frame
5. Primary winding
6. Secondary winding
7. Heating element
8' Winding body
8" Winding body
9' Recess
9" Recess
10' Casting means
10" Casting means
11' Protective layer
11" Protective layer

The invention claimed is:

1. A device for heating food by inductive coupling, comprising:
    a ferrite winding body configured to direct magnetic flux;
    at least one secondary winding formed from a current conductor to which at least one heating element is connected, wherein the at least one secondary winding is mounted in the winding body; and
    an insulated casting that mounts the secondary winding in the winding body, the insulating casting having a coefficient of thermal expansion substantially corresponding to that of the winding body.

2. The device according to claim 1 and further comprising an electrically non-conducting protective layer having a small thickness disposed on the winding body, said layer having a coefficient of thermal expansion which substantially corresponds to that of the winding body.

3. The device according to claim 1, wherein the coefficient of thermal expansion of the casting means is matched to the coefficient of thermal expansion of the winding body for a temperature range of 20° C. to 150° C.

4. The device according to claim 1, wherein the winding body has a recess in which the secondary winding is arranged.

5. The device according to claim 1, wherein the winding body is rotationally symmetrical.

6. The device according to claim 1, wherein the casting comprises at least one of epoxy resin and polyamide.

7. The device according to claim 1, wherein the casting comprises filler.

8. The device according to claim 7, wherein the filler includes ceramic.

9. The device according to claim 1, wherein the heating element comprises at least one heating conductor having selected one of a meander-shaped and a bifilar spiral profile.

10. The device according to claim 1 and further comprising thermal insulation disposed between the secondary winding and the heating element.

11. The device according to claim 10, wherein the thermal insulation comprises vermiculite.

12. The device according to claim 1, wherein the the insulating casting includes epoxy resin or polyamide.

13. The device according to claim 12, wherein the insulating casting includes filler.

14. The device according to claim 1, wherein the winding body is configured to direct the magnetic flux toward the secondary winding.

15. A device for heating food by induction, comprising:
    a primary winding formed from a current conductor and connectable to a voltage source;
    a ferrite winding body configured to direct magnetic flux, wherein the primary winding is mounted in the winding body; and
    an insulating casting disposed within the winding body, the insulating casting mounting the primary winding in the winding body, the insulating casting having a coefficient of thermal expansion substantially corresponding to that of the winding body.

16. The device according to claim 15, wherein the winding body is configured to direct the magnetic flux away from the primary winding.

17. A device for heating food by inductive coupling, comprising:
    a ferrite winding body configured to direct magnetic flux;
    at least one secondary winding formed from a current conductor to which at least one heating element is connected, wherein the at least one secondary winding is mounted in the ferrite winding body; and
    an electrically non-conducting protective layer having a small thickness disposed on the winding body, said layer having a coefficient of thermal expansion which substantially corresponds to that of the winding body.

18. The device according to claim 17, wherein the protective layer has a high material hardness.

19. The device according to claim 17, wherein the protective layer is an amorphous hydrocarbon layer.

20. The device according to claim 17, wherein the protective layer has a maximum thickness of 500 μm.

21. The device according to claim 17, wherein the protective layer is a film arranged on the winding body.

22. The device according to claim 17, wherein the protective layer consists of at least one of ceramic and polytetrafluoroethylene (PTFE).

23. The device according to claim 17, wherein the protective layer comprises an amorphous hydrocarbon layer.

24. A device for heating food by induction, comprising:
    a primary winding formed from a current conductor and connectable to a voltage source;
    a ferrite winding body configured to direct magnetic flux, wherein the primary winding is mounted in the ferrite winding body; and
    an electrically non-conducting protective layer having a small thickness disposed on the winding body, said layer having a coefficient of thermal expansion which substantially corresponds to that of the winding body.

* * * * *